United States Patent
Kossat

(10) Patent No.: US 9,008,481 B2
(45) Date of Patent: Apr. 14, 2015

(54) ARRANGEMENT FOR PROCESSING OPTICAL WAVEGUIDES

(75) Inventor: Rainer M. Kossat, Aschau (DE)

(73) Assignee: CCS Technology, Inc., Wilmington, DE (US)

( * ) Notice: Subject to any disclaimer, the term of this patent is extended or adjusted under 35 U.S.C. 154(b) by 1213 days.

(21) Appl. No.: 12/640,695

(22) Filed: Dec. 17, 2009

(65) Prior Publication Data

US 2010/0158463 A1 Jun. 24, 2010

(51) Int. Cl.
*G02B 6/00* (2006.01)
*G02B 6/25* (2006.01)
*G02B 6/245* (2006.01)

(52) U.S. Cl.
CPC . *G02B 6/25* (2013.01); *G02B 6/245* (2013.01)

(58) Field of Classification Search
USPC ................................................ 385/134, 147
See application file for complete search history.

(56) References Cited

U.S. PATENT DOCUMENTS

| | | | | |
|---|---|---|---|---|
| 5,893,302 | A * | 4/1999 | Strom | 81/9.51 |
| 5,999,682 | A | 12/1999 | Vincent et al. | 385/184 |
| 6,105,480 | A * | 8/2000 | Osaka et al. | 83/444 |
| 6,467,667 | B1 * | 10/2002 | Durian et al. | 225/105 |
| 6,978,071 | B2 * | 12/2005 | Hwang et al. | 385/134 |
| 2003/0113087 | A1 * | 6/2003 | Lee et al. | 385/136 |
| 2004/0120678 | A1 | 6/2004 | Hwang et al. | 385/134 |
| 2006/0251374 | A1 * | 11/2006 | Chou et al. | 385/136 |
| 2008/0282522 | A1 * | 11/2008 | Song et al. | 29/33.52 |

FOREIGN PATENT DOCUMENTS

| | | | | |
|---|---|---|---|---|
| DE | 102006036330 A1 | 2/2008 | | G02B 6/25 |
| DE | 202007015180 U1 | 3/2008 | | G02B 6/25 |
| DE | 202008009468 U1 | 10/2008 | | G02B 6/24 |
| WO | WO 99/47954 | 9/1999 | | G02B 6/25 |
| WO | WO 2006/112675 A1 | 10/2006 | | G02B 6/25 |

* cited by examiner

*Primary Examiner* — Michelle R Connelly

(57) ABSTRACT

An arrangement for processing at least one optical fiber that includes a first processing element and a second processing element for processing at least one optical waveguide. The first and second processing elements have a common base element and a common actuating element for simultaneously actuating the first and second processing elements. The actuating element is capable of moving relative to the base element.

19 Claims, 1 Drawing Sheet

ARRANGEMENT FOR PROCESSING OPTICAL WAVEGUIDES

RELATED APPLICATIONS

This application claims the benefit of German Application No. 202008016860.0, filed Dec. 19, 2008, the entire contents of which are hereby incorporated by reference.

BACKGROUND

The disclosure relates to an arrangement for processing at least one optical waveguide.

In optical waveguide connection technology, there is often the problem for an individual fitter that there are limited options for setting down devices at his work site, for example options for setting down end-stripping pliers or severing devices for optical waveguides. In addition, a plurality of devices is required which need to be used alternately.

SUMMARY

The disclosure is directed to an arrangement for processing at least one optical waveguide which makes efficient and safe working possible.

One embodiment includes an arrangement for processing at least one optical waveguide comprises a first processing element for processing the at least one optical waveguide. The arrangement furthermore comprises at least one second processing element for processing the at least one optical waveguide. The first processing element and the at least one second processing element have a common base element. The first processing element and the at least one second processing element have a common actuating element for simultaneously actuating the first processing element and the at least one second processing element. The common actuating element is capable of moving relative to the base element.

In another embodiment, the base element comprises at least one guide device for the at least one optical waveguide and a blade for removing an outer coating of a section of the at least one optical waveguide. The base element can have a cleaning element for cleaning the at least one optical waveguide.

In a further embodiment, the base element has a severing element for severing the at least one optical waveguide. The severing element can comprise a severing blade.

The first processing element and the at least one second processing element can each have one of the following processing elements: an end-stripping apparatus for removing an outer coating of a section of the at least one optical waveguide, a cleaning apparatus for cleaning the section of the at least one optical waveguide, a severing device for severing the at least one optical waveguide.

In a further embodiment, the first processing element has a lever, which is capable of moving rotatably about a spindle relative to the base element. The second processing element can have a further lever, which is capable of moving rotatably about the spindle relative to the base element. The spindle is fixed in position relative to the base element.

The lever and the further lever can be coupled to the common actuating element, with the result that, if the common actuating element is moved relative to the base element, the lever and the further lever are moved uniformly relative to the base element. The longitudinal direction of the lever and the longitudinal direction of the further lever can be in the same direction.

In one embodiment, the base element has a plurality of hinges. The lever and the further lever can be coupled to the base element in each case via at least two hinges of the plurality of hinges. The spindle runs through the plurality of hinges. The spindle runs along the longitudinal direction of the at least one optical waveguide.

In still another embodiment, the arrangement comprises a waste container for holding at least one severed part of the at least one optical waveguide. The waste container can be coupled to the base element.

The arrangement can comprise a mechanism for transporting the at least one severed part into the waste container.

In a further embodiment, the arrangement comprises a further actuating element for actuating the mechanism for transporting the at least one severed part. The further actuating element can be coupled to the actuating element.

In one embodiment, the arrangement comprises at least one third processing element for processing optical waveguides. The first processing element, the at least one second processing element and at least one third processing element have the common base element. The first processing element, the at least one second processing element and at least one third processing element have the common actuating element for simultaneously actuating the first processing element, the at least one second processing element and at least one third processing element. The first processing element can comprise an end-stripping apparatus. The second processing element can comprise a cleaning apparatus, and the third processing element a severing device. The end-stripping apparatus, the cleaning apparatus and the severing device can be actuated jointly by the actuating element.

BRIEF DESCRIPTION OF THE DRAWINGS

Further features, advantages and developments result from the examples below explained in connection with FIGS. 1 and 2, in which.

DETAILED DESCRIPTION

Figure 1:
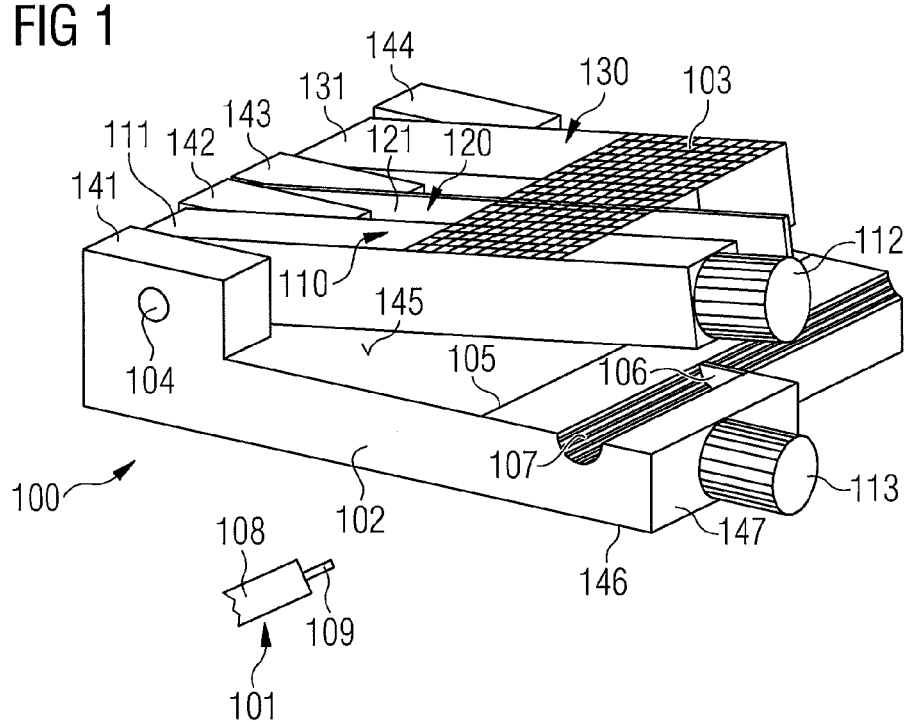
FIG. 1 shows an arrangement for processing at least one optical waveguide in accordance with one embodiment.

FIG. 1 shows an arrangement 100 for processing at least one optical waveguide 101. The arrangement 100 has a base element 102. The arrangement 100 has a first processing element 110 and a second processing element 120. Furthermore, the arrangement 100 has a third processing element 130. The processing elements 110, 120 and 130 are designed for processing the optical waveguide 101.

The base element 102 has, in one region, a plurality of hinges 141, 142, 143 and 144. In a region opposite the region with the hinges, the base element 102 has a guide device, in particular a groove 107. The guide device, in particular the groove 107, is designed to align the at least one optical waveguide relative to the base element. A groove 105 runs substantially parallel to the groove 107. The groove 105 and the groove 107 enter the base element 102 from a surface 145. The hinges 141 to 144 are likewise arranged on the surface 145. The base element 102 can be positioned with an underside 146 on a substrate.

The optical waveguide 101 has a core 109 in the center, in which core light can be guided. The core 109 is surrounded by a material with a lower refractive index than the core 109. This material forms a sheath 108 around the core 109. The groove 107 enters the base 102 approximately in the form of a semicircle. The groove 107 forms a cutout, which is at least so deep and wide that part of the optical waveguide, in terms of length, can be laid in the groove 107, in particular with the sheath 108. In one embodiment, the diameter of the groove 107 corresponds substantially to the outer diameter of the sheath 108. The width and depth of the groove 107 is at least as large as the diameter of the sheath 108.

A blade 106 is arranged on the base element 102 transversely with respect to the groove 107. The blade is designed to cut into the sheathing 108 of the optical waveguide 101. The groove 107 is designed to align the at least one optical waveguide relative to the blade 106. The blade is designed to cut into the sheathing 108 of the optical waveguide 101 as far as the core 109, without damaging the core 109. In the exemplary embodiment shown, the blade 106 terminates with the surface 145 of the base element 102. The blade 106 has a notch, with the result that the sheath 108 of the optical waveguide 109 can be cut into and the core 109 is then arranged in the notch and is not damaged by the blade 106.

The base element 102 has a cleaning element 113 on a front side 147. The front side 147 is aligned transversely with respect to the surface 145. The front side 147 of the base element 102 is on that side of the base element 102 which faces away from the hinges 141 to 144. In the exemplary embodiment shown, the cleaning element 113 is cylindrical. The cleaning element 113 can be coupled to the base element 102 so as to be rotatable relative to the base element 102. The cleaning element 113 is designed to clean the core 109 of the optical waveguide 101. In particular, the core 109 of the optical waveguide can be cleaned of residues of the sheathing 108 by the cleaning element 113.

The first processing element 110 has a lever 111. The lever 111 is capable of moving relative to the base element 102. The lever 111 can be rotated about the spindle 104 relative to the base element 102. The lever 111 can be moved from the position shown in the direction of the base element 102. The lever 111 is coupled to the base element 102 via the hinge 141 and the hinge 142.

The lever 111 and at least part of the base element 102 form the processing element 110. In the exemplary embodiment illustrated, the processing element 110 is a cleaning apparatus for cleaning a section of the core 109 of the optical waveguide 101. A cleaning element 112 is coupled to the lever 111. The cleaning element 112 is cylindrical and capable of rotating relative to the lever 111. The cleaning element 112 is coupled to the lever 111 in such a way that, if the lever 111 is moved in the direction of the base element 102, the cleaning element 112 and the cleaning element 113 are arranged adjacent to one another. The cleaning element 112 and the cleaning element 113 are designed to jointly clean at least part of the core 109 of the optical waveguide 101.

The arrangement 100 has a second lever 121. The lever 121 is capable of moving relative to the base element 102. The lever 121 is coupled to the base element 102 via the hinge 142 and the hinge 143. The lever 121 can be moved about the spindle 104 relative to the base element 102 in the direction of the base element 102.

The lever 121 has a further blade (not shown), which corresponds in terms of its function to the blade 106. The blade which is arranged on the lever 121 and the blade 106 are each designed to cut into the sheathing 108 of the optical waveguide 101, with the result that part of the core 109 can be freed of the sheathing. The lever 121 and at least part of the base element 102 form the actuating element 120. In the exemplary embodiment shown, the actuating element 120 is an end-stripping apparatus for removing an outer coating of a section of the at least one optical waveguide, in particular for removing a section of the sheathing 108.

The arrangement 100 has a third lever 131. The lever 131 is capable of moving relative to the base element 102. The third lever 131 is coupled to the base element 102 via the hinges 143 and 144. The third lever 131 is capable of rotating about the spindle 104 relative to the base element 102. The lever 131 can be moved in the direction of the base element 102. The lever 131 forms, with at least part of the base element 102, the third processing element 130. In the exemplary embodiment shown, the third processing element 130 is a severing device for severing the at least one optical waveguide 101. Elements which are not explicitly shown, for example an anvil and/or clamping jaws, are arranged on the lever 131.

The first lever 111, the second lever 121 and the third lever 131 are coupled to one another via a common actuating element 103. The actuating element 103 couples the lever 111, the second lever 121 and the third lever 131 in such a way that, if one of the levers 111, 121, 131 is moved in the direction of the base element 102, the other two of the levers 111, 121, 131 are likewise moved in the direction of the base element 102.

The optical waveguide can be freed at least partly from the sheathing 108 with the aid of the arrangement 100. During operation, a pressure is exerted on the actuating element 103 in the direction of the base element 102 and, as a result, both the lever 111, the lever 121 and the lever 131 are moved in the direction of the base element 102. The optical waveguide 101 is inserted into the notch 107 in a first step. The optical waveguide 101 is inserted into the notch 107 in such a way that a region of the sheathing 108 is in contact with the blade 106. Owing to a pressure being exerted on the actuating element 103 in the direction of the base element 102, the levers 111, 121 and 131 are moved in the direction of the base element 102. The levers 111, 121 and 131 are moved such that the blade which is arranged on the lever 121 likewise comes into contact with the outer sheathing 108 of the optical waveguide 101. As a result of a further movement in the direction of the base element 102, the sheathing 108 is cut into. Owing to the optical waveguide 101 being drawn back, the sheathing 108 can be removed from the core 109. Then, the levers 111, 121 and 131 can be moved into the initial position shown. The optical waveguide 101 with the partially exposed core 109 is thereupon removed from the notch 107.

In a further step, the exposed part of the core can be cleaned with the aid of the arrangement 100. The exposed part of the core 109 is positioned on the cleaning element 113 and/or the cleaning element 112. As a result of a renewed pressure being exerted on the actuating element 103 in the direction of the base element 102, the lever 111, the lever 121 and the lever 131 are again moved in the direction of the base element 102. The levers 111, 121 and 131 are moved such that the cleaning element 112 and the cleaning element 113 have at least partial contact with the exposed part of the core 109. Owing to the optical waveguide being drawn back, the core 109 can be cleaned. In this case, the cleaning element 112 and the cleaning element 113 can rotate. A rotation of the cleaning element 112 and a rotation of the cleaning element 113 can in each case be driven by a movement of the lever 111 relative to the base element 102. The cleaning element 112 is replaceable, with the result that, when it has become too dirty, it can be replaced by a new clean one. The cleaning element 113 is replaceable, with the result that, when it has become too dirty, it can be replaced by a new clean one.

The optical waveguide, in particular the exposed core 109, can be severed with the aid of the arrangement 100. The exposed core 109 of the optical waveguide 101 is inserted into the groove 105 in a next step. Owing to a renewed pressure exerted on the actuating element 103 in the direction of the base element 102, the levers 111, 121 and 131 are moved in the direction of the base element 102. Owing to the movement, the optical waveguide is clamped in between the base element 102 and the lever 131. A severing element (not shown) which is arranged on the base element 102 is used to carve into the core 109 at a desired point and pressure of the anvil is used to break the core. The severing element is in particular a severing blade, which is designed to carve into at least the core 109 of the optical waveguide 101.

In one arrangement 100, both the sheathing 108 of the optical waveguide 101 can be removed from regions of the core 109. Thereupon, the core 109 can be cleaned by the arrangement 100. Then, the optical waveguide can be severed by the arrangement 100. Only the arrangement is required for the individual processing steps, and not a plurality of individual tools. The respective processing elements of the arrangement 100 are actuated by the common actuating element 103. Both removal of the sheathing 108 and cleaning of the core 109 and severing of the optical waveguide can be implemented by the actuating element 103. A movement of the actuating element 103 relative to the base element 102 in the direction of the base element 102 actuates the operating elements 110, 120 and 130, with the result that the levers 111, 121 and 131 move uniformly in the direction of the base element 102. The spindle 104 about which the levers 111, 121 and 131 move is substantially parallel to the groove 105. The spindle 104 is substantially parallel to the groove 107.

In the embodiment shown, the arrangement 100 has the three processing elements 110, 120 and 130. In a further embodiment, the arrangement has two processing elements, for example an end-stripping apparatus and a cleaning apparatus. The arrangement can additionally have another combination of processing elements, for example an end-stripping apparatus and a severing device. In a further embodiment, the arrangement has more than three processing elements, for example four or more processing elements.

Figure 2:
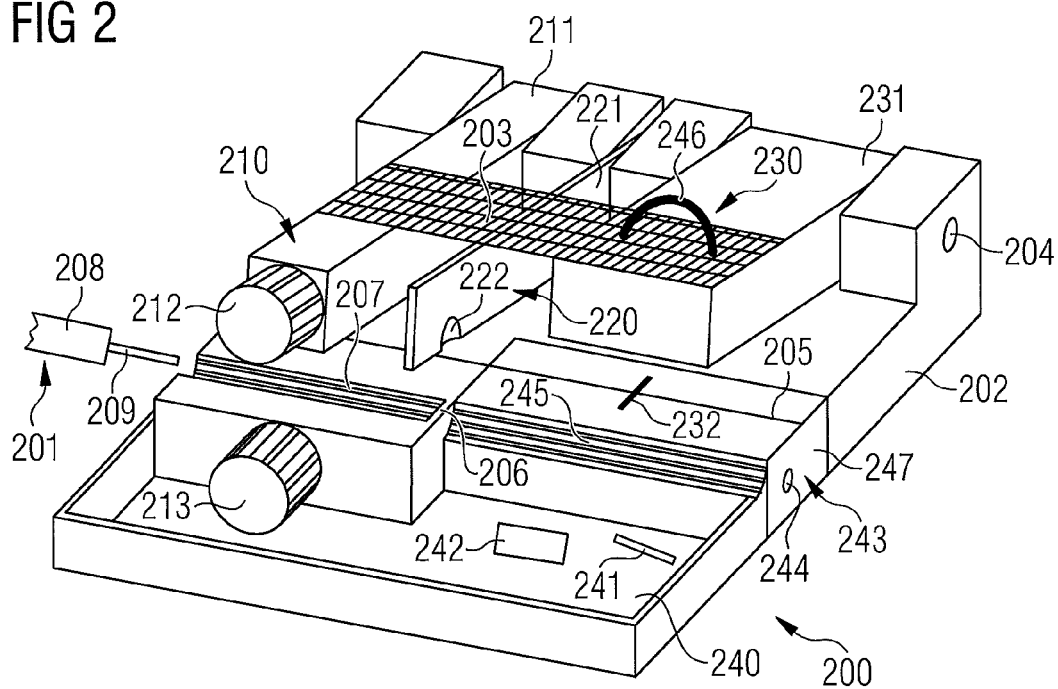
FIG. 2 shows an arrangement for processing at least one optical waveguide in accordance with a further embodiment.

FIG. 2 shows an arrangement 200 for processing one or more optical waveguides 201. The arrangement in accordance with the exemplary embodiment in FIG. 2 corresponds substantially to the arrangement as described in connection with FIG. 1. In addition, the arrangement 200 has a waste container 240. Further additionally, the arrangement 200 has a mechanism 243 for transporting a severed part 241, 242 of the optical waveguide 201.

The arrangement 200 has a base element 202. A lever 211 of a first processing element 210 is coupled to the base element 202 so as to be capable of moving about the spindle 204 relative to the base element 202. A cleaning element 212 is coupled rotatably to the lever 211 on the lever 211. Adjacent thereto, a cleaning element 213 is coupled to the base 202. In the exemplary embodiment shown, the actuating element 210 is a cleaning apparatus, which comprises the lever 211 and the base element 202.

Adjacent to the lever 211, a further lever 221 is coupled to the base element 202. The lever 221 is capable of moving rotatably about the spindle 204 relative to the base element 202. The lever 221 has a blade 222. The blade 222 corresponds to a blade 206, which is arranged on the base element 202. The lever 221 forms, together with the base element 202, an actuating device 220, in the exemplary embodiment shown an end-stripping apparatus. The blades 206 and 222 can be used to cut into an outer sheathing 208 of the optical waveguide 201, with the result that a core 209 of the optical waveguide 201 can be exposed.

A third lever 231 is coupled to the base element 202 rotatably about the axis 204 relative to the base element 202. The third lever 231 is part of a third processing element 230. In the exemplary embodiment shown, the third processing element 230 is a severing device for severing the optical waveguide 201. For this purpose, a severing element, preferably a severing blade 232, is arranged in the region of the lever 231 on the base element 202. The severing blade 232 can carve into the core 209 of the optical waveguide 201. An anvil (not shown), which is arranged on the lever 231, can exert pressure on the point which has been carved into, with the result that the core 209 of the optical waveguide 201 breaks and the optical waveguide is thus severed.

The levers 211, 221 and 231 are coupled to one another via a common actuating element 203. The common actuating element 203 is used for actuating the processing element 210. The actuating element 203 is used for actuating the processing element 220. The actuating element 203 is used for actuating the processing element 230. Owing to a movement of the actuating element 230 in the direction of the base element 202, the lever 211, the lever 221 and the lever 231 are moved uniformly in the direction of the base element 202. Owing to this movement, the optical waveguide can be freed from the outer sheathing 208 in one region by the blades 206 and 222 if it is arranged in the groove 207. Owing to a further movement of this kind, the exposed core 209 can be cleaned by the cleaning elements 212 and 213. Owing to yet a further movement of this kind, the optical waveguide can be severed by the severing blade 232, if at least the core 209 has been inserted in a groove 205 which runs parallel to the groove 207.

A sloping edge 245 adjoins the groove 207 in aligned fashion. The groove 207 is arranged on one side of the blade 206. The one sloping edge is arranged on the other side of the blade 206. The sloping edge 245 is at an angle in relation to the surface of the base element 202. The one sloping edge 245 is arranged adjacent to the waste container 240. Part of the sheathing which has been released from the optical waveguide 201 can slide into the waste container via the sloping edge 245.

The waste container 240 is coupled to the base element 202. The waste container 240 is designed to catch a plurality of severed parts of the optical waveguide 201. The waste container 240 can hold both the severed part 242 of the sheathing 208 and the severed part 241 of the core 209.

After the severing operation, a severed part of the core 209 comes to lie in the groove 205. This part of the groove 205 in which the severed part of the core 209 lies after the severing operation is adjacent to the mechanism 243. The mechanism 243 comprises a movable lever element 247. The lever element 247 is capable of rotating relative to the base element 202 about a spindle 244. The spindle 244 runs substantially parallel to the groove 205. The spindle 244 runs substantially parallel to the spindle 204.

The lever element 247 is capable of moving relative to the base element 202 in such a way that the severed part of the optical waveguide which lies in the groove 205 can be delivered to the waste container 240. For this purpose, the lever element 247 is tipped about the spindle 244. The movement of the lever element 247 for transporting the severed part of the optical waveguide can be caused by a movement of the actuating element 203. The mechanism 243 can deflect a movement of the actuating element 203 into a movement of the lever element 247. In one embodiment, the actuating element 203 can be moved away from the base element 202 out of the rest position shown by a further actuating element 246, which is coupled to the actuating element 203. This movement of the actuating element 203 in the direction away from the base element 202 can be deflected by the mechanism 243 into a tipping movement of the lever element 247. The severed part of the optical waveguide which lies in the groove 205 is delivered into the waste container 240 by this movement of the actuating element 203 away from the base element 202. If the actuating element 203 is moved away from the base element 202, the lever 211, the lever 221 and the lever 231 move away from the base element 202.

With one arrangement 200, both the sheathing 208 of the optical waveguide 201 can be removed from at least regions of the core 209. Thereupon, the core 209 can be cleaned by the arrangement 200. Then, the optical waveguide can be severed by the arrangement 200. A severed part of the optical waveguide can automatically be transported into the waste container 240.

The invention claimed is:

1. An arrangement for processing at least one optical waveguide, comprising:
   a first processing element for processing the at least one optical waveguide;
   at least one second processing element for processing the at least one optical waveguide, wherein
   the first processing element and the at least one second processing element having a common base element; and
   the first processing element and the at least one second processing element have a common actuating element for simultaneously actuating the first processing element and the at least one second processing element, wherein the actuating element is capable of moving relative to the base element and the first processing element have a lever capable of moving rotatably about a spindle relative to the base element, the second processing element has a further lever capable of moving rotatably about the spindle relative to the base element and the spindle is fixed in position relative to the base element;
   wherein the first processing element and the at least one second processing element each have a different processing element selected from the following processing elements:
      an end-stripping apparatus for removing an outer coating of a section of the at least one optical waveguide;
      a cleaning apparatus for cleaning the section of the at least one optical waveguide; and
      a severing device for severing the at least one optical waveguide.

2. The arrangement of claim 1, wherein the base element has at least one guide device for the at least one optical waveguide and a blade for removing an outer coating of a section of the at least one optical waveguide.

3. The arrangement of claim 1, wherein the base element has a cleaning element for cleaning the at least one optical waveguide.

4. The arrangement of claim 1, wherein the base element has a severing element for severing the at least one optical waveguide.

5. The arrangement of claim 1, wherein the lever and the further lever are coupled to the common actuating element, with the result that, if the common actuating element is moved relative to the base element, the lever and the further lever are moved uniformly relative to the base element.

6. The arrangement of claim 1, wherein the longitudinal direction of the lever and the longitudinal direction of the further lever are in the same direction.

7. The arrangement of claim 1, wherein:
   the base element has a plurality of hinges;
   the lever and the further lever are coupled to the base element in each case via at least two hinges of the plurality of hinges; and
   the spindle runs through the plurality of hinges.

8. The arrangement of claim 1, wherein the spindle runs along the longitudinal direction of the at least one optical waveguide.

9. The arrangement of claim 1, further comprising:
   a waste container for holding at least one severed part of the at least one optical waveguide, wherein the waste container is coupled to the base element.

10. The arrangement of claim 9, further comprising:
    a mechanism for transporting the at least one severed part into the waste container.

11. The arrangement of claim 10, further comprising:
    a further actuating element for actuating the mechanism for transporting at least one severed part, wherein the further actuating element is coupled to the actuating element.

12. The arrangement of claim 1, further comprising:
    at least one third processing element for processing optical waveguides, wherein
    the first processing element, the at least one second processing element and at least one third processing element have the common base element;
    the first processing element, the at least one second processing element and at least one third processing element have the common actuating element for simultaneously actuating the first processing element, the at least one second processing element and at least one third processing element; and
    the first processing element comprises the end-stripping apparatus;
    the second processing element comprises the cleaning apparatus; and
    the third processing element comprises the severing device, wherein the end-stripping apparatus, the cleaning apparatus and the severing device can be actuated jointly by the actuating element.

13. A device for processing at least one optical waveguide, comprising:
    a first processing element for processing the at least one optical waveguide;
    at least one second processing element for processing the at least one optical waveguide, wherein
    the first processing element and the at least one second processing element having a common base element; and
    the first processing element and the at least one second processing element having a common actuating element for simultaneously actuating the first processing element and the at least one second processing element, wherein the actuating element is capable of moving relative to the base element;
    wherein the first processing element and the at least one second processing element each have a different processing element selected from the following processing elements:
       an end-stripping apparatus for removing an outer coating of a section of the at least one optical waveguide;
       a cleaning apparatus for cleaning the section of the at least one optical waveguide; and
       a severing device for severing the at least one optical waveguide.

14. The device of claim 13, further comprising:
    at least one third processing element for processing optical waveguides, wherein
    the first processing element, the at least one second processing element and at least one third processing element have the common base element;

the first processing element, the at least one second processing element and at least one third processing element have the common actuating element for simultaneously actuating the first processing element, the at least one second processing element and at least one third processing element; and the first processing element comprises the end-stripping apparatus;

the second processing element comprises the cleaning apparatus; and the third processing element comprises the severing device, wherein the end-stripping apparatus, the cleaning apparatus and the severing device can be actuated jointly by the actuating element.

15. The device of claim 13, wherein the base element has at least one guide device for the at least one optical waveguide and a blade for removing an outer coating of a section of the at least one optical waveguide.

16. The device of claim 13, wherein the base element has a cleaning element for cleaning the at least one optical waveguide.

17. The device of claim 13, wherein the base element has a severing element for severing the at least one optical waveguide.

18. The device of claim 13, further comprising:
a waste container for holding at least one severed part of the at least one optical waveguide, wherein the waste container is coupled to the base element.

19. The device of claim 18, further comprising:
a mechanism for transporting the at least one severed part into the waste container.

* * * * *